United States Patent [19]

Herbelleau et al.

[11] 4,298,046
[45] Nov. 3, 1981

[54] WINTER TIRE

[75] Inventors: Yves Herbelleau, Gourbeyre; Charles Flechtner, Clermont-Ferrand, both of France

[73] Assignee: Compagnie Generale des Etablissements Michelin, Clermont-Ferrand, France

[21] Appl. No.: 167,068

[22] Filed: Jul. 9, 1980

Related U.S. Application Data

[63] Continuation-in-part of Ser. No. 18,850, Mar. 8, 1979, abandoned.

[30] Foreign Application Priority Data

Jul. 24, 1979 [FR] France .................... 79 19253

[51] Int. Cl.³ ............................ B60C 11/12
[52] U.S. Cl. .................. 152/209 R; 152/210; 152/209 D
[58] Field of Search ............ 152/209 R, 209 D, 210, 152/211

[56] References Cited

U.S. PATENT DOCUMENTS

| 2,240,542 | 5/1941 | Bourdon | 152/209 R |
| 2,538,491 | 1/1951 | Winston | 152/209 R |
| 3,586,086 | 1/1971 | Baileau | 152/209 R |
| 3,768,535 | 10/1973 | Holden | 152/209 R |

FOREIGN PATENT DOCUMENTS 43383  5/1934  France .

Primary Examiner—Michael W. Ball
Attorney, Agent, or Firm—Brumbaugh, Graves, Donohue & Raymond

[57] ABSTRACT

Tire intended for winter travel, having a tread comprising relief elements provided with slits inclined with respect to the normal to the tread and which are close to each other and form strips between each other, is improved due to the fact that, when the tire is not under load, the slits are inclined with respect to said normal by an angle at most equal to 45° in the direction of the tangential stresses on the tire exerted by the ground and due to the fact that these slits have a width which is other than zero.

7 Claims, 6 Drawing Figures

WINTER TIRE

This application is a continuation-in-part application of U.S. application Ser. No. 18,850, filed Mar. 8, 1979, now abandoned.

The present invention relates to a pneumatic tire intended for winter travel, the tread of which has relief elements (blocks or ribs).

From French Pat. No. 759,592 and its patent of addition No. 43,383 it is known to divide the relief elements of the tread into a number of strips by means of numerous slits which are close to each other, in order to increase the adherence of the tires to snow-covered, slippery or wet ground. French Pat. No. 779,108 discloses the provision of thin metallic blades of suitable shape in the walls of the mold, in order to produce such slits or notches. In order to facilitate the manufacture of the molds and the removal of the vulcanized tires from the molds, use is made of slits perpendicular to the surface of the tread; however, the slits may have any trace with respect to the longitudinal direction of the tire. These patents also teach that instead of providing slits perpendicular to the surface of the tread, the slits may have any desired inclination with respect to said surface.

Perpendicular slits also improve the adherence of tires on snow and ice. However, winter tires frequently travel over roads which are free of snow or ice and it is then found, at the end of a certain number of miles, that the improvement due to the perpendicular slits has decreased when these tires again travel on snow and ice. This decrease appears at the same time as the sharp edge formed by the leading edge of each of the slits (seen in the direction of the tangential stresses on the tire exerted by the ground) becomes and remains rounded. This is due to the deformations suffered by each of the rubber strips defined by two consecutive slits. This phenomenon is particularly apparent on radial carcass tires, the tread of which is stabilized by a tread reinforcement of low deformability.

The problem forming the basis of the invention is to overcome the decrease in adherence on snow and ice which results from the rounding of the leading edges of the strips defined by the slits described above.

The principle of the solution in accordance with the invention resides in selecting the inclination of the slits with respect to the normal to the tread, and therefore of the strips defined by said slits, in such a manner as to avoid the rounding of the leading edges of the strips.

Thus, the tire in accordance with the invention, having a tread comprising relief elements provided with slits inclined with respect to the normal to the tread and which are close to each other and form strips between each other is characterized by the fact that, when the tire is not under load, the slits are inclined with respect to said normal by an angle at most equal to 45° in the direction of the tangential stresses on the tire exerted by the ground, and by the fact that these slits have a width which is other than zero.

It is advantageous to incline the slits in accordance with the invention with due consideration of the orientation of the tangential stresses on the tire exerted by the ground and of the effects which it is desired to obtain, i.e., longitudinal adherence upon braking or acceleration. Furthermore, the slits which are inclined in the direction of rotation of the tire should be located in the two lateral zones of the tread width, while those inclined in the opposite direction should be provided in the central zone of the tread width.

The drawing and the following description which refers thereto are intended to show the advantages of the invention and its operation, as well as an illustrative embodiment.

Figure 1:
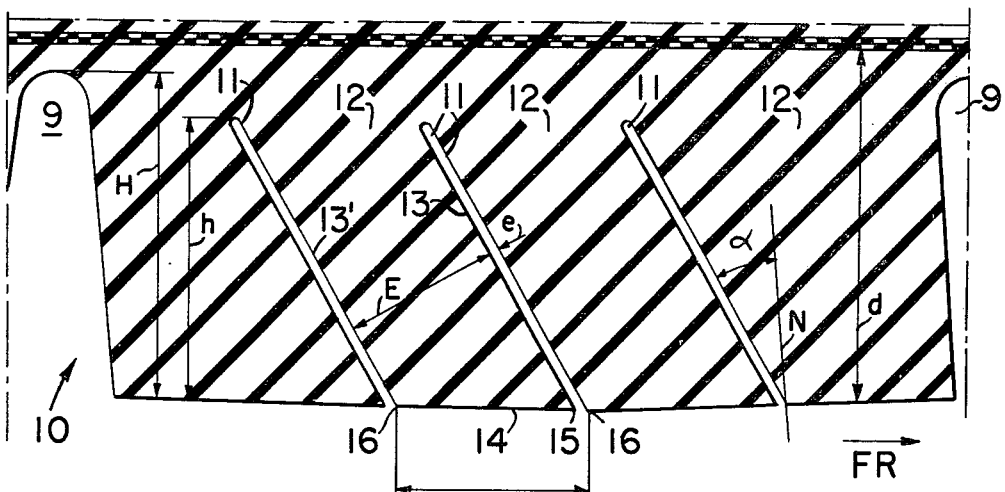
FIGS. 1 to 4 are views in longitudinal section of a relief element provided with slits in accordance with the invention and shown when the new tire is not under load (FIG. 1), when it is under load (FIG. 2), when it starts to become worn but not under load (FIG. 3) and then under load (FIG. 4)

FIG. 1 shows a relief element 10 of a tread (not shown) of a tire provided with slits 11 in accordance with the invention. This relief element 10 is bounded by two relatively wide grooves 9 of a depth H. The slits 11 are close to each other and define strips 12; the slits 11 have a width "e" and a depth "h". One of the walls 13 of the slits 11 forms, with the bearing surface 14 of the tread, the leading edge 15 of the strips 12 while the other wall 13' forms the trailing edge 16 of the strips 12. The slits 11 form an acute angle α with the inner normal N to the tread. From one slit 11 to the next, the inclination α may vary by an amount at most equal to 30°. The depth h, which is close to H, may vary from one slit 11 to the next in a ratio at most equal to 0.5. In the example shown, the slits 11 are inclined in the direction of forward rotation FR of the tire. These slits 11 are active in case of longitudinal acceleration. In order to obtain slits which are active in case of braking, it is advisable to incline the slits in the direction opposite the direction of forward rotation FR.

Figure 2:
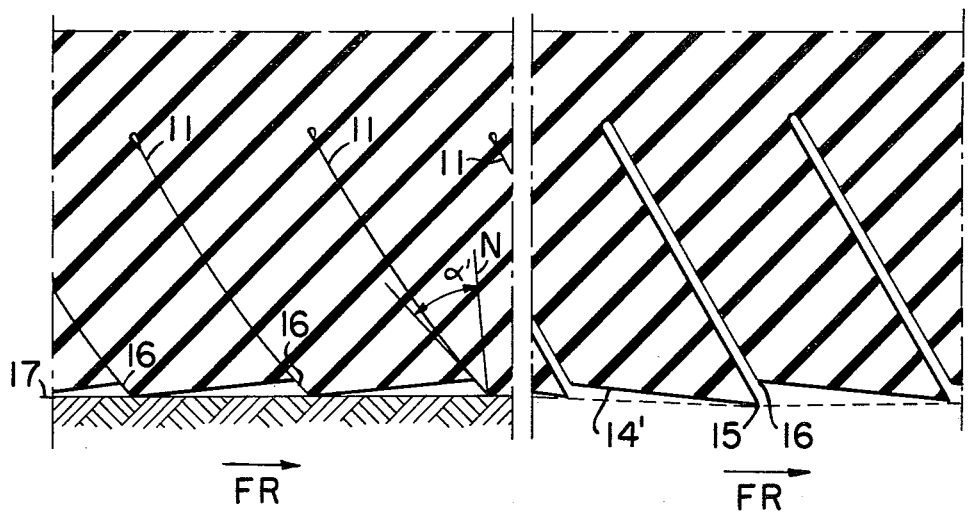
Figure 3:

When the new tire is under load and crushed on the ground 17 (FIG. 2), the strips 12 of the relief element 10 of FIG. 1 become deformed, the slits 11 closing. Due to the existence of these slits 11, the inclination α increases and becomes α' and only the trailing edges 16 bear against the ground 17. After a certain period of travel, it is noted that the bearing surfaces 14 of the strips 12 have changed their inclination as compared with their initial state (FIG. 1) and become, in the tire when not under load (FIG. 3), inclined bearing surfaces 14'.

Figure 4:
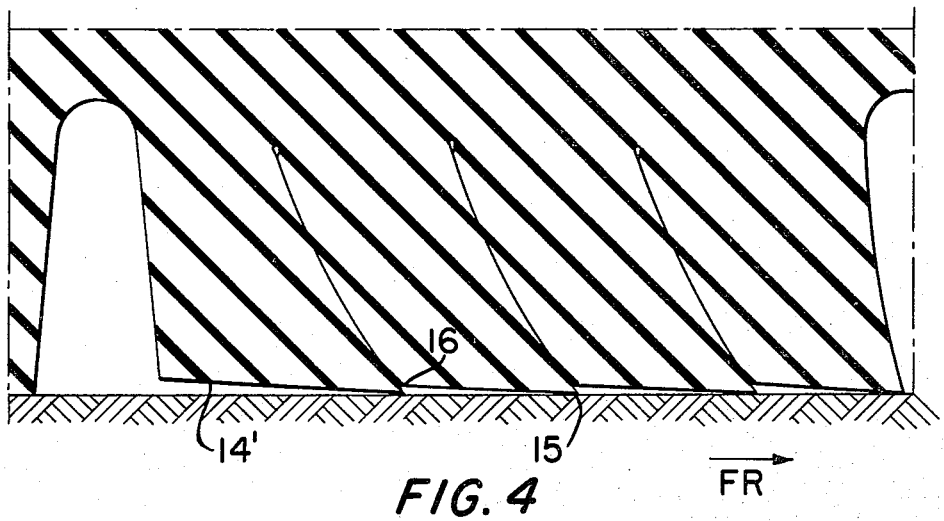

Thus (FIG. 4), as a result of its wear, the trailing edge 16 of a strip frees, in the circumferential direction, the leading edge 15 of the following strip when the tire under load rests on the ground.

Figure 5:
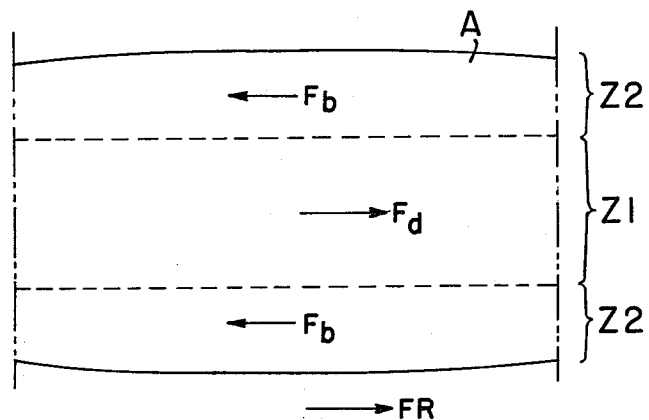
FIG. 5 shows a portion of the contact path of a rolling loaded tire, the arrow FR pointing in the direction of forward rotation, the arrows $F_d$ and $F_b$ symbolizing the direction of the driving and braking forces, respectively, exerted by the ground on the tread.

In FIG. 5, the portion A of the area of contact of a tire with the ground is formed of a median or equatorial or central zone Z1 centered on the equator XX' (FIG. 6) of the tire T and two lateral zones Z2 which adjoin on opposite sides the central zone Z1 and are delimited by the edges B (FIG. 6) of the tread. The central zone is from about ¼ to about ⅔ of the tread width.

The arrow FR indicates the direction of forward rotation of the tire T and the arrow $F_d$ in the central zone Z1 and the arrows $F_b$ in the two lateral zones Z2 indicate the driving and braking forces, respectively, exerted by the ground on the tread.

Figure 6:
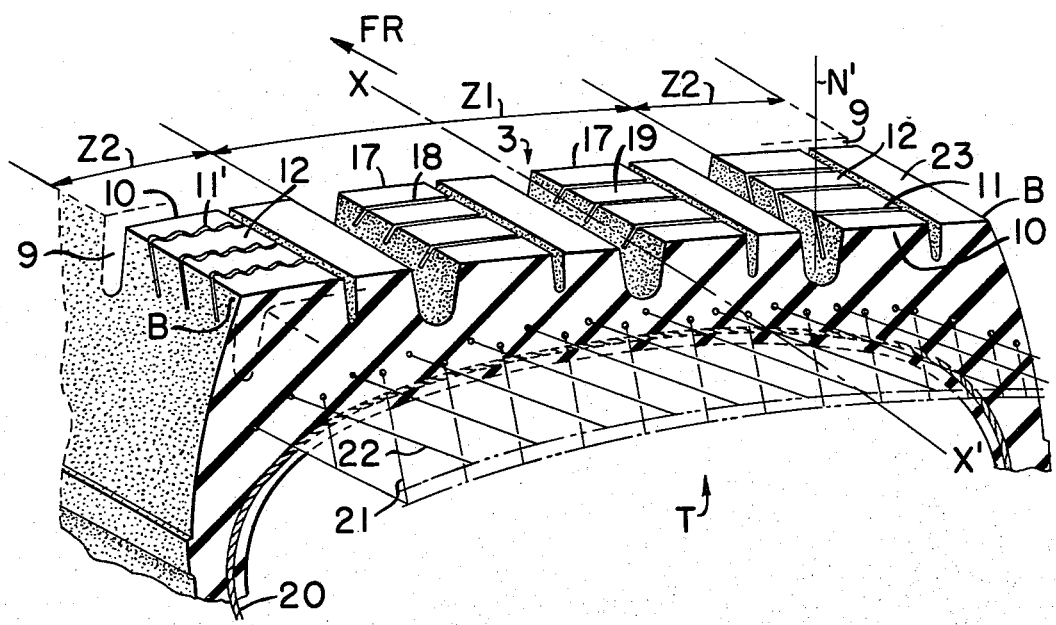
FIG. 6 is a perspective view, from above, of a tire tread cross-section embodying a tread reinforcement.

In FIG. 6, the arrow FR also indicates the direction of forward rotation of the tire T whose tread 3 comprises, in the two lateral zones Z2, relief elements or blocks 10 with slits 11 or 11' of a width other than zero defining strips 12. These slits may have a linear trace like the slits 11 or an undulated trace like the slits 11'. The slits 11 and 11' in the blocks 10 are, in accordance with the invention, inclined with respect to the outer normal N' to the tread 3 by an angle at most equal to 45° in the direction of forward rotation FR of the tire T so as to be active in longitudinal acceleration. In the central zone Z1 of the tread 3, relief elements or blocks 17 are provided with slits 18 of a width other than zero which define strips 19. In accordance with the invention, these slits 18 are inclined with respect to the outer normal N' to the tread 3 by an angle at most equal to 45° (preferably at most equal to 25°) in a direction opposite the direction of forward rotation FR of the tire T so as to be active in braking. In the two lateral zones Z2 the inclination of the slits 11, 11', in absolute value, is preferably smaller than the inclination of the slits 18 in the central zone Z1. The tire is provided with a radial carcass reinforcement 20 and with a tread reinforcement formed of two plies of crossed cables 21 and 22 which, for clarity in the drawing, have been shown much further apart from each other than they actually are.

The tread 3 may furthermore be provided in each of the zones Z1, Z2, with relief elements or blocks 23 which are without slits and permit the embedment of antiskid studs (not shown).

The inclination of the strips and their width makes it possible, in accordance with the invention, to cause directed wear of the bearing surfaces of the strips during a period of travel and then maintain the release of the leading edges once this is established. The effect of the invention is therefore practically independent of the degree of wear of the tread.

The suitable value of the inclination $\alpha$ of the slits, measured when the tire is not under load, is at most equal to 45°.

By way of example, the variation of the angle forming the leading edge of the strips in accordance with the invention can be evaluated in accordance with the following calculation in the case of strips intended to increase the longitudinal adherence.

Let:

P be the pitch of the slits, that is to say the distance between the trailing edges of two consecutive strips of a group of strips of the tire not under load, $\alpha$ be the inclination of the slits with respect to the normal to the tread of the tire not under load, $\alpha$ be the inclination of the slits with respect to the normal to the tread due to the flexing of the strips under the effect of the load which crushes the tire, e be the width of the slits measured perpendicular to the walls which form the slits of a tire not under load, E be the thickness of the strips of a tire not under load such that $E = P \cos \alpha - e$, R be the radius of the tire not under load, and d be the distance from the surface of the tread to the radially outermost tread reinforcement ply of the tire not under load; therefore the contraction of the pitch P of the strips in the area of contact to a length P' is in accordance with the known expression:

$$\frac{P'}{P} = \frac{R-d}{R}$$

Under these conditions:

$$\cos \alpha' = \frac{P \cos \alpha - e}{P'} = \frac{R}{R-d} \times \frac{P \cos \alpha - e}{P} = \frac{E}{P} \cdot \frac{R}{R-d}$$

The decrease in the angle $\gamma$ formed by the leading edge after the commencement of wear of the tire in accordance with the invention is equal to the difference between the angles ($\alpha - \alpha'$) derived from the above relations, that is to say to the difference (arc cos $\alpha$ − arc cos $\alpha'$).

In practice, it is recommended to provide for a variation of the angle by wear of between 0° for the leading edges of the strips by means of the above relations.

In the entire above description and in the claims which follow, the word "slit" is to be understood as designating not only a slit which is linear in the direction of its depth and/or width but also a slit having any other trace, for instance curved, undulated, etc., whatever the sectional plane (longitudinal, transverse or oblique) considered.

What is claimed is:

1. A tire intended for winter travel, having a tread comprising relief elements bounded by grooves and provided with consecutive slits inclined with respect to the outer normal to the tread which are close to each other and form strips between each other, characterized by the fact that
    (a) the slits are located in the central zone of the tread width and in the two lateral zones of the tread width;
    (b) the depth of the slits is about equal to the depth of the grooves;
    (c) when the tire is not under load, the slits which are located in the central zone are inclined with respect to said normal by an angle at most equal to 45° in the direction opposite the direction of forward rotation of the tire so as to be active in braking and the slits which are located in the two lateral zones are inclined with respect to said normal by an angle at most equal to 45° in the direction of forward rotation of the tire so as to be active in longitudinal acceleration;
    (d) the slits have a width which is other than zero and such that, when the tire is under load and and crushed on the ground, the slits are closed; and
    (e) the tread comprises a radial carcass reinforcement surrounded by a tread reinforcement.

2. The tire according to claim 1, characterized by the fact that in the central zone the inclination of the slits is preferably at most equal to 25°.

3. The tire according to claim 1, characterized by the fact that in the two lateral zones the inclination of the slits, in absolute value, is preferably smaller than the inclination of the slits in the central zone.

4. The tire according to claim 1, characterized by the fact that the leading edges of the strips are adapted to undergo variations of angles $\alpha - \alpha'$ of between 0° and 20°, the angles $\alpha$ and $\alpha'$ resulting from the equations $$\cos \alpha = \frac{E+e}{P} \text{ and } \cos \alpha' = \frac{E}{P} \cdot \frac{R}{R-d},$$

in which, when the tire is not under load, $\alpha$ is the inclination of the slits of width e with respect to the normal to the tread, P is the pitch of the slits, E is the thickness of the strips, d is the distance from the surface of the tread to the radially outermost tread reinforcement ply of the tire, and R is the radius of the tire; and in which, when the tire is under load, $\alpha'$ is the inclination of the slits with respect to the normal to the tread.

5. The tire according to claim 1, characterized by the fact that the inclination of the slits varies by an amount at most equal to 30° from one slit to the next.

6. The tire according to claim 1, characterized by the fact that the central zone is from about ½ to about ⅔ of the tread width.

7. The tire according to claim 1, characterized by the fact that the central zone and the two lateral zones have relief elements which are without slits and permit the embedment of antiskid studs.

* * * * *